(12) United States Patent
Krishnaprasad et al.

(10) Patent No.: US 7,756,798 B2
(45) Date of Patent: Jul. 13, 2010

(54) EXTENSIBLE MECHANISM FOR DETECTING DUPLICATE SEARCH ITEMS

(75) Inventors: Muralidhar Krishnaprasad, Fremont, CA (US); Ciya Liao, Mountain View, CA (US); Thomas H. Chang, Redwood Shores, CA (US); Meeten Bhavsar, Emerald Hills, CA (US)

(73) Assignee: Oracle International Corporation, Redwood Shores, CA (US)

( * ) Notice: Subject to any disclaimer, the term of this patent is extended or adjusted under 35 U.S.C. 154(b) by 401 days.

(21) Appl. No.: 11/714,418

(22) Filed: Mar. 6, 2007

(65) Prior Publication Data

US 2008/0222063 A1 Sep. 11, 2008

(51) Int. Cl.
*G06N 5/00* (2006.01)
(52) U.S. Cl. .......................................... 706/15; 706/45
(58) Field of Classification Search ................... 706/45, 706/46, 47, 15; 707/200
See application file for complete search history.

(56) References Cited

U.S. PATENT DOCUMENTS

| | | | |
|---|---|---|---|
| 4,597,044 A * | 6/1986 | Circello ...................... 713/100 |
| 6,278,992 B1 * | 8/2001 | Curtis et al. ................... 707/3 |
| 6,547,829 B1 * | 4/2003 | Meyerzon et al. ........... 715/234 |
| 6,615,209 B1 | 9/2003 | Gomes et al. |
| 6,658,423 B1 * | 12/2003 | Pugh et al. .................. 707/102 |
| 6,665,837 B1 * | 12/2003 | Dean et al. .................. 715/234 |
| 7,139,756 B2 * | 11/2006 | Cooper et al. .................. 707/6 |
| 7,457,279 B1 * | 11/2008 | Scott et al. ................... 370/352 |
| 2002/0103737 A1 * | 8/2002 | Briere .......................... 705/36 |
| 2003/0172066 A1 | 9/2003 | Cooper et al. |
| 2003/0204430 A1 * | 10/2003 | Kalmick et al. ................. 705/8 |
| 2006/0036696 A1 | 2/2006 | Maresh |
| 2006/0041597 A1 * | 2/2006 | Conrad et al. ............... 707/200 |
| 2006/0248066 A1 * | 11/2006 | Brewer .......................... 707/4 |
| 2007/0234398 A1 * | 10/2007 | Muehlbauer ................ 725/145 |

* cited by examiner

*Primary Examiner*—Wilbert L Starks, Jr.
(74) *Attorney, Agent, or Firm*—Kraguljac & Kalnay, LLC

(57) ABSTRACT

Systems, methods, and other embodiments associated with identifying and selectively deleting duplicate search results are described. One example system embodiment includes logic to receive an identity indicator from a search logic. The identity indicator is associated with a search item that the search logic determines to be relevant to a search request. The example system may also include logic to determine whether the search result associated with the identity indicator is a duplicate result based on comparing the identity indicator to another identity indicator associated with another search result.

28 Claims, 6 Drawing Sheets

EXTENSIBLE MECHANISM FOR DETECTING DUPLICATE SEARCH ITEMS

CROSS REFERENCE TO RELATED APPLICATION(S)

The present application is related to U.S. patent application Ser. No. 11/974,085, filed Oct. 11, 2007, entitled "Extensible Mechanism for Grouping Search Results," inventors Chang, et al., and commonly assigned to the present assignee.

BACKGROUND

Conventional search systems may include some logic to detect and remove duplicate documents. This logic tends to be fixed and pre-defined. This logic also tends to rely solely on text-based comparisons. Thus, these conventional systems may compare document content, the URL of documents, and/or document metadata to determine whether documents are duplicates. These conventional systems may adequately identify duplicate documents that appear in different locations. However, these duplicates tend to be exact duplicates (e.g., same document stored in different locations). Some items may be so similar, or may refer to items that are so related (e.g., meeting, email) that they do not justify separate hits in response to a search. Conventional systems may not identify these items as duplicates.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
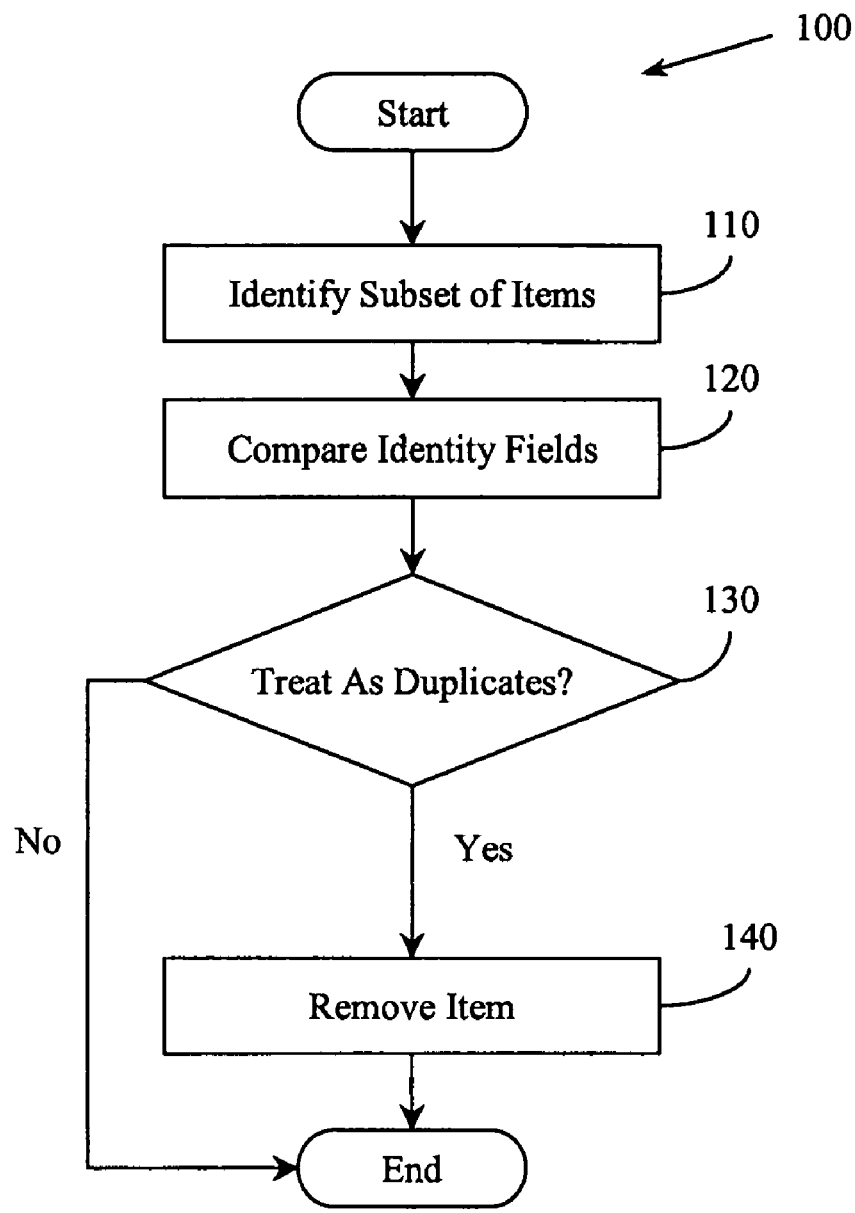
FIG. 1 illustrates an example method associated with detecting and handling duplicate search items.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a storage medium that participates in directly or indirectly storing signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Crawler", as used herein, refers to an automated process that browses through a crawl frontier in a systematic, automated manner. A crawler may browse through a set of reachable locations and update an index concerning the locations, gather information from the locations, perform maintenance, and so on. The crawlers described herein may be used to search for information relevant to a search request. Thus, a search engine may provide a crawler with a string(s) and/or a gram(s) to search for, and then the crawler may systematically, automatically traverse its crawl frontier looking for these string(s) and/or gram(s). Additionally, in one example, the crawlers described herein may receive a control value from a search engine that indicates that only items having an identity field or an identity callback field are to be returned in response to a search request.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware software stored in a computer-readable medium, software in execution, and/or combinations of each to perform a function(s) or an action(s), and/or to cause a function or action from another logic, method, and/or system. For example, based on a desired application or needs, logic may include a software controlled microprocessor, a discrete logic (e.g., application specific integrated circuit (ASIC)), an analog circuit, a digital circuit, a programmed logic device, a memory device containing instructions, and so on. Logic may include one or more gates, combinations of gates, or other circuit components. Logic may also be fully embodied as software in execution in a processor on stored on a computer-readable medium. Where multiple logical logics are described, it may be possible to incorporate the multiple logical logics into one physical logic. Similarly, where a single logical logic is described, it may be possible to distribute that single logical logic between multiple physical logics.

"Object" is used herein in its computer science term of art form (e.g., object-oriented). Thus, "object" refers to an entity that includes both data and methods for manipulating the data. Portions of the data may be public while portions may be private. Similarly, some object methods may be public while some object methods may be private.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities including a processor, an operating system, a logic, software, or other entity. Logical and/or physical communication channels can be used to create an operable connection.

"Query", as used herein, refers to a semantic construction that facilitates gathering and processing information. A query may be formulated in a database query language (e.g., structured query language (SQL)), an object query language (OQL), a natural language, and so on. A query might be implemented in computer code (e.g., C#, C++, Javascript) that can be employed to gather information from various data stores and/or information sources.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. "Software" does not refer to stored instructions being claimed as stored instructions. The instructions may be embodied in various forms including routines, algorithms, modules, methods, threads, and/or programs including separate applications or code from dynamically linked libraries. Software may be implemented in a variety of executable and/or loadable forms including, but not limited to, a stand-alone program, a function (local and/or remote), a servelet, an applet, instructions stored in a memory, part of an operating system, or other types of executable instructions.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, displaying, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 for detecting and handling duplicate search items. A set of computer-executable instructions that may cause a computer to perform method 100 may be stored on a computer-readable medium. Method 100 may include, at 110, identifying a subset of items. The subset of items may be identified from a set of items provided by a search process. The search process may have provided the set of items in response to a search request. The search process may have identified the set of items as being relevant to the search request.

In one example, identifying the subset of items includes selecting members that have related identity fields. Related identity fields are those that are capable of being compared to each other to determine whether the items associated with the identity fields are to be treated as duplicates. In another example, all items returned by the search process may be deemed to have identity fields that can be compared. In this example, no identification of "related" identity fields is required before comparing identity fields and thus the subset identified may be the entire set of items provided by the search process, may be a pair of items with similar relevance scores, may be a random pair of items, may be N consecutive items (N being an integer), may be N randomly selected items, and so on.

Method 100 may also include, at 120, comparing identity fields of members of the subset. The comparison may include comparing an entire field, comparing a portion of a field, comparing field contents, comparing a duplication identifier portion of an identity field, and so on. Note that fields associated with items are compared rather than the items themselves. Conventionally, a bit-wise, byte-wise, gram-wise, and/or string-wise comparison of the actual items may have been made. This comparison might have been performed using items that had already been retrieved from remote locations. By examining fields associated with items that have yet to be retrieved, significant retrieval processing may be avoided. In one example, however, the fields associated with the items as well as the items may be retrieved. In this example, selected retrieved items are discarded after identity field comparison. While a single identity field is described, in one example an item returned by the search process may include multiple identity fields. Thus, a decision concerning whether items are to be treated as duplicates may depend on comparisons of multiple fields.

Method 100 may also include, at 130, determining whether the comparison of the related identity fields indicates that the items associated with the identity fields are to be treated as duplicates. Determining whether items are to be treated as duplicates provides more flexibility than conventional duplicate matching.

Consider how two emails may be treated as duplicates when one is an original email and another is a reply to the original. The reply, if it includes both the original and the reply, may be considered the "most relevant" item and the original email may be considered a duplicate that can be deleted. Thus, the identity field associated with an item may include information that facilitates determining both whether items are to be treated as duplicates, and also, when items are to be treated as duplicates, which item (if any) is to be given "priority". While two emails are described, the subset of items may include a series of emails, for example.

Consider also a series of monthly meetings scheduled on an electronic calendar. A conventional search may retrieve all meetings and supply all meetings as different relevant hits. The conventional search may not identify the meetings as duplicates because each meeting may be held on a different date and thus at least the data field may differ between the entries. A calendar manager may maintain an identity field associated with the set of meetings. For example, the calendar manager may identify the series of meetings as duplicates and identify the next meeting as the priority item between duplicates.

Consider also two documents that describe the same relevant item. A first document may be in English while a second document may be in French. An identity field associated with the documents may identify them as duplicates and a priority field may identify which is to be retained based, for example, on a relationship to a language associated with a session from which a search request was provided.

Method 100 may also include, at 140, selectively removing a member from the subset of items upon determining that items associated with the identity fields are to be treated as duplicates. Removing the member may include deleting the item, deleting a pointer to the item, not retrieving an item, and so on.

In one example, method 100 may also include providing the search request to the search process. The search request may be formatted to indicate that the search process is to provide identity fields associated with items. In one example, the search request may indicate the size and format of the identity field for the search process to provide. Additionally, the search request may indicate the size and format of a priority field for the search process to provide. Having provided the search request, in one example method 100 may also include receiving the set of items from the search process.

Emails and calendar entries are mentioned above. It is to be appreciated that the set of items returned by the search process may include different types of things. For example, the set of items may include an email, a calendar entry, a document, a file, a record, and an object. The document may be, for example, a word processing document, a spread sheet document, and so on. The file may be, for example, an HTML file, an XML file, and so on. The record may be, for example, a purchase order, a client relationship management record, a sales receipt, a message, and so on. The object may be, for example, a productivity object (e.g., word processing object, spread sheet object), a business object (e.g., back office application object, front office application object), and so on. While various documents, files, and objects are described, it is to be appreciated that method 100 may process items for which an identity field is available.

The search process may be performed, for example, by an enterprise search engine, by a set of crawlers, and so on. While an enterprise search engine and a crawler are described, it is to be appreciated that items that are both relevant to a query and formatted with an identity field may be returned by different search processes. The identity field may be populated in different ways. For example, a crawler may include logic and intelligence to select and/or create an identity field value for a crawled item. Similarly, an object manager (e.g., email server) may create and assign an identity field value to an item. An application, (e.g., word processor) may also create and assign an identity field value to an item. In one example, the identity field may be populated after an item has been processed (e.g., crawled, indexed).

Figure 2:
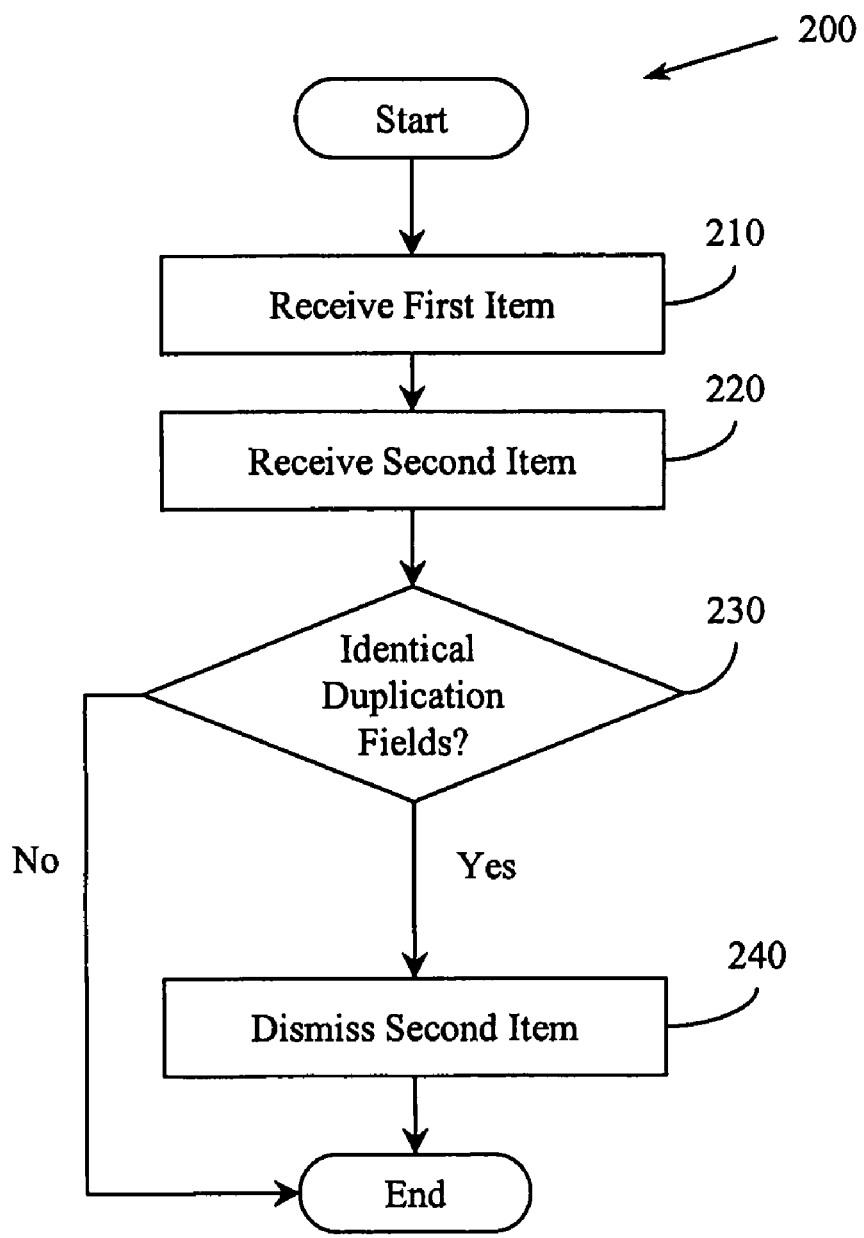
FIG. 2 illustrates another example method associated with detecting and handling duplicate search items.
Figure 3:
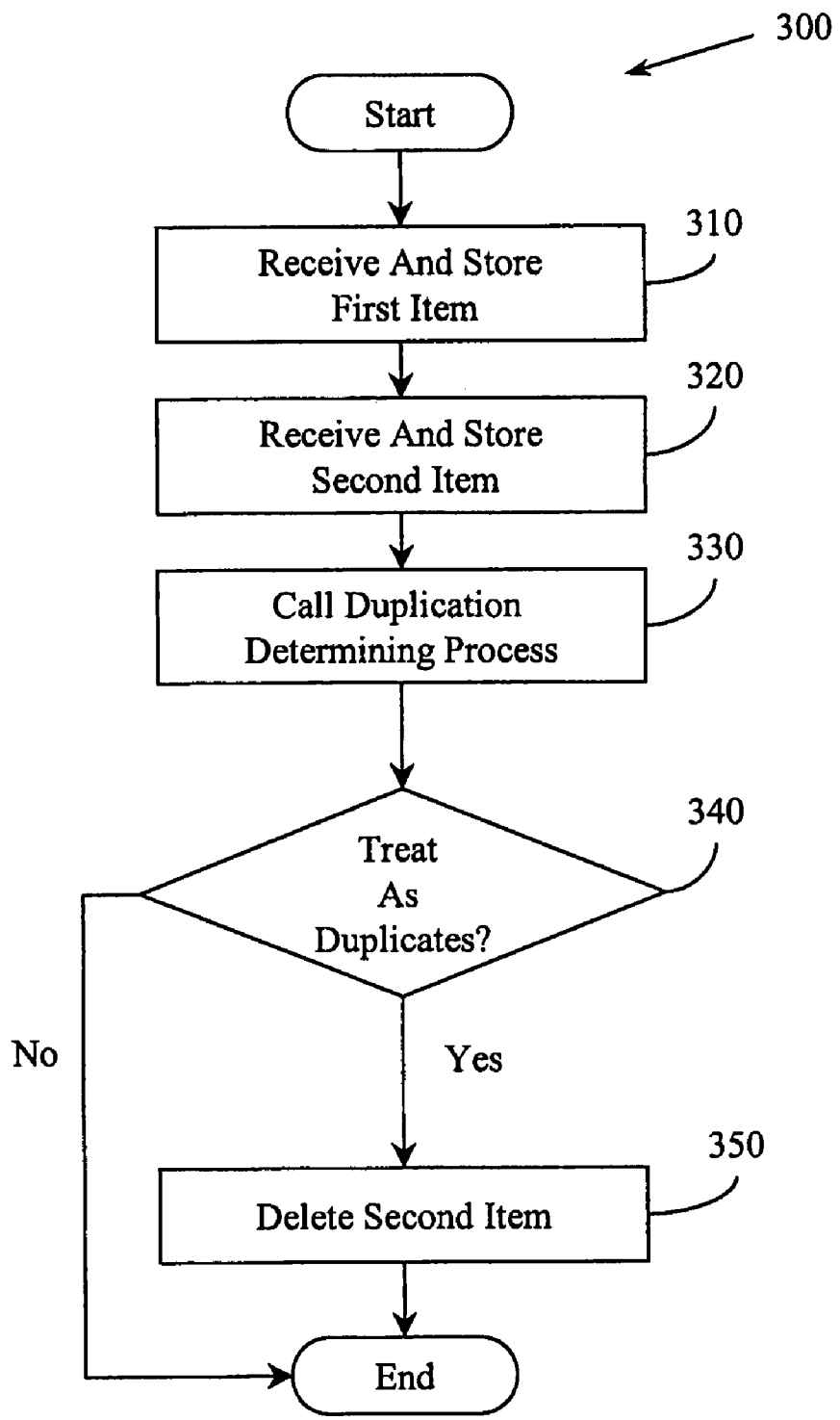
FIG. 3 illustrates another example method associated with detecting and handling duplicate search items.

FIG. 1 illustrates a method 100 that may be performed after a portion of a search and/or after a complete search have provided a set of items. FIG. 2, described below, illustrates a method 200 that may be performed "on the fly" as search results are provided. FIG. 1 illustrates a method 100 that compares identity fields. FIG. 3, described below, illustrates a method 300 where a separate process is invoked to determine whether items are to be treated as duplicates.

While FIG. 1 illustrates various actions occurring in serial, it is to be appreciated that various actions illustrated in FIG. 1 could occur substantially in parallel. By way of illustration, a first process could identify subsets of items, a second process could compare identity fields and determine whether items are to be treated as duplicates, and a third process could selectively remove items. While three processes are described, it is to be appreciated that a greater and/or lesser number of processes could be employed and that lightweight processes, regular processes, threads, and other approaches could be employed.

While method 100 is described above, it is to be appreciated that other example methods described herein may also be implemented as processor executable instructions and/or operations stored on a computer-readable medium. Thus, in different examples, a computer-readable medium may store processor executable instructions operable to perform the methods described and claimed herein.

FIG. 2 illustrates a method 200 that may be performed on the fly as results are provided by a search process. Method 200 may include, at 210, receiving a first item in response to a search. The first item will include a duplication field that can be compared to other items with duplication fields to determine whether the items are to be treated as duplicates.

Thus, method 200 may also include, at 220, receiving a second item in response to the search. This second item may also include a duplication field. Having two items with duplication fields, method 200 may continue, at 230, by determining whether the value of the duplication field of the second item equals the value of the duplication field of the first item. When the values are equal, method 200 may proceed, at 240, to dismiss the second item.

Once again the items received may include documents, files, objects, emails, calendar entries, and so on, that may be retrieved by an enterprise search engine. In one example, the enterprise search engine may use crawlers to perform a portion(s) of the search. Thus, the enterprise search engine may control a crawler(s) to return certain results. The results returned may, in different examples, be limited to results that include a duplication field, be limited to results that include a certain type of duplication field, be limited to results that include a certain sized duplication field, and so on. In one example, the duplication field may already exist in the searched items, having been created and/or populated by an application and/or object manager. However, in another example, the duplication field may be populated by a crawler as it searches or by an item source as it responds to a search request. In yet another example, the duplication field may be populated after an item has been indexed.

FIG. 3 illustrates a method 300 that may be performed on the fly as results are retrieved and/or on a set of stored items. Method 300 may include, at 310, storing a first item received in response to a search. Instead of having a duplication field or identity field, the first item may include a duplication callback identifier. The duplication callback identifier can be used to invoke a process that will determine whether items are to be treated as duplicates. This facilitates making the search result duplicate determination extensible and isolating the determination from the receiver. Applications, object managers, crawlers, item sources, and so on, that may provide results that are relevant to a search may define their own process that will identify whether items are to be treated as duplicates. This process may be available through the callback identifier.

Consider the email example mentioned in connection with method 100 (FIG. 1). In method 100, a value was provided that could be examined by the receiver of emails returned as relevant search results. This places the duplicate intelligence in the receiver, making the receiver responsible for doing the identity field comparison. In method 300, no such value is provided. Instead, a callback identifier (e.g., process address, remote procedure call address) is provided. This callback identifier tells the receiver what process is available to compare the emails. This removes the intelligence from the receiver and puts it elsewhere, leaving the receiver responsible only for deciding whether to call the remote process. Thus, when matching callback identifiers (e.g., matching remote procedure call addresses) are identified, a determination of whether items are duplicates can be made by the provider of the item with which the callback identifier is associated (e.g., provider of the email). While an email is described, other item providers (e.g., calendars, thread managers, object managers, discussion forums) may also provide callable processes for determining whether the items they provide are duplicates.

Method 300 may also include, at 320, storing a second item received in response to the search. The second item may also include a duplication callback identifier. In one example, when the duplication callback identifiers associated with the first and second item match, then the callback can occur. In one example, items processed may be limited to items associated with a single pre-defined callback identifier. In this example, callback identifiers do not have to be matched before the callback can occur.

Method 300 may also include, at 330, calling the process associated with the callback identifier and, at 340, determining whether the two items are to be treated as duplicates based on the result of the process. Therefore, method 300 may include, at 350, selectively deleting the second item upon determining that a process available through the duplication callback identifier determined that the first item and the second item are to be treated as duplicates. While comparing two items is described, it is to be appreciated that a process may receive more than two inputs and identify duplicates in the larger set. For example, the callback process may be provided with a list of items from which duplicates are to be culled, a set of items from which duplicates are to be removed, a pointer to a set of items from which duplicates are to be removed, and so on. Additionally, as described above, a priority document, which may be treated as "superior among equals", may be determined. This duplicate may be retained while the "inferior" duplicates are deleted.

Documents that are "treated as duplicates" may not be identical. For example, documents having lower relevance scores that are substantially identical may be treated as duplicates even though they are dissimilar. More frequently, being treated as duplicates may be applied to families of emails, families of related meetings, families of postings to a thread, families of purchase orders, and so on.

The process available through the duplication callback identifier may be, for example, a user-definable process. This facilitates item providers changing their definition of "duplicate" over time without requiring the receiver to change its logic. In different examples the process that determines whether items are to be treated as duplicates may be a local process, a remote process, and so on.

Figure 4:
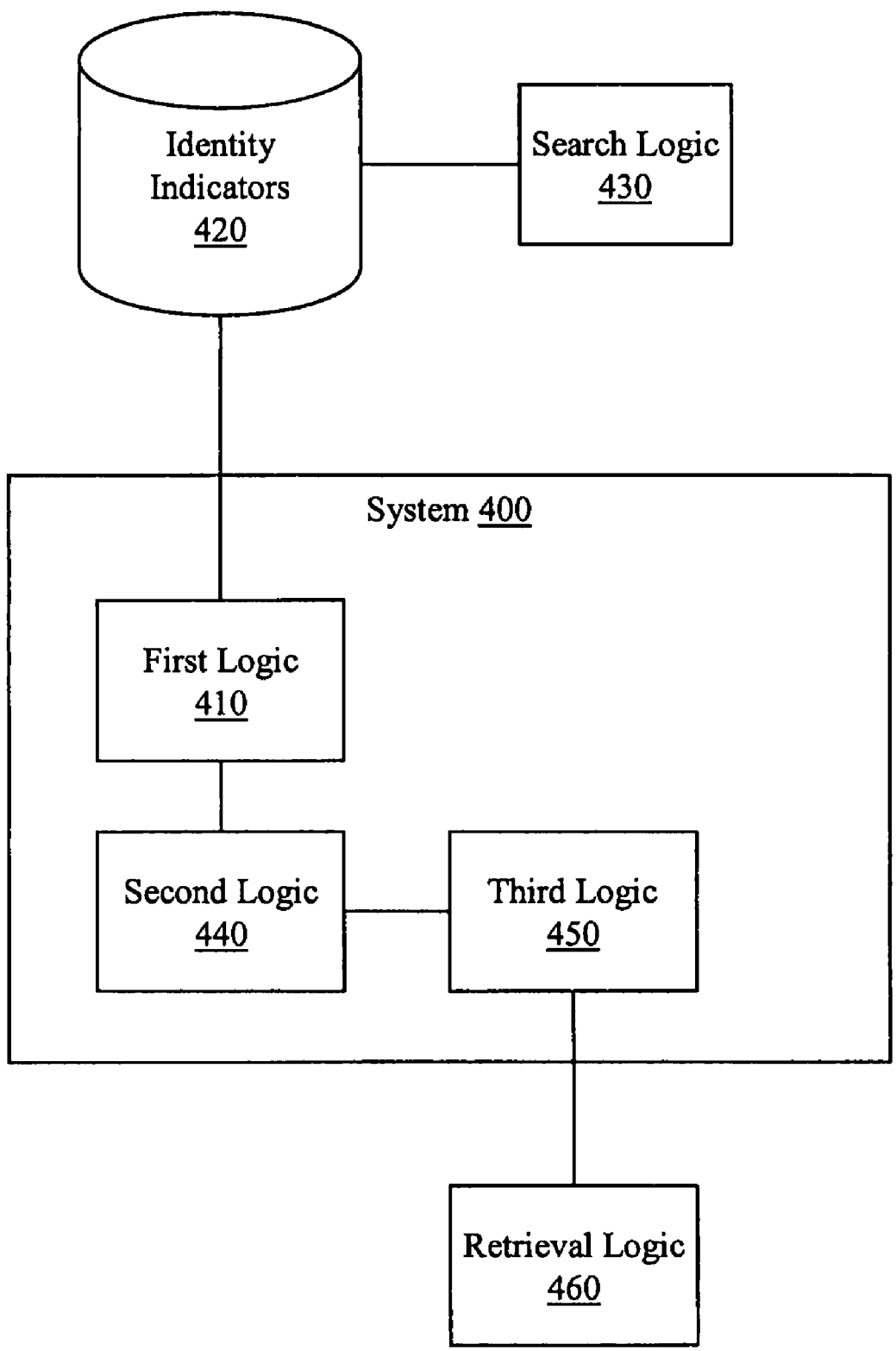
FIG. 4 illustrates an example system associated with detecting and handling duplicate search items.

FIG. 4 illustrates a system 400 that identifies and selectively removes duplicate search results. System 400 may include a first logic 410 that receives a set of identity indicators 420 returned by a search logic 430 in response to a search request (e.g., query). Search logic 430 may search an enterprise for items relevant to the search request and may return the identity indicators 420. In one example, the search logic 430 will return only the identity indicators 420 while in another example the search logic 430 may also retrieve items associated with the identity indicators 420. The search logic 430 may be, for example, an enterprise search engine. Thus, rather than searching the entire World Wide Web, or the entire Internet, a search may be restricted to items owned by an enterprise. These items may include documents, files, objects, messages, emails, calendar entries, database records, posts to threads in a discussion forum, and so on. With so many types of sources available, the search logic 430 may selectively control a crawler logic(s) to acquire the set of identity indicators 420. In this way, individual crawlers can be configured to search individual types of sources rather than having a monolithic search engine that knows how to search every conceivable type of item source. As described above, the search may be restricted to an enterprise and thus the crawl frontier for a crawler may be restricted to enterprise locations.

System 400 may also include a second logic 440 to identify unique members of the set of identity indicators 420. In one example, the second logic 440 may identify unique members of the set of identity indicators by comparing individual identity indicators to each other. This comparison may result in the identification of unique identity indicators and of duplicate identity indicators. Items associated with unique identifiers are candidates for retrieval. Additionally, one item associated with each set of duplicate identity indicators may also be a candidate for retrieval.

System 400 may also include a third logic 450 that will cause a retrieval logic 460 to selectively retrieve items associated with unique members of the set of identity indicators 420 as determined by the second logic 440. The third logic 450 may also cause the retrieval logic 460 to retrieve one item for each subset of duplicate identity indicators. As described above, there may be a document that is "superior amongst equals", in which case the retrieval logic 460 may retrieve that superior equal. In other cases, no such superiority will be identified, in which case any of the duplicates may be retrieved. While identity indicators 420, search logic 430, and retrieval logic 460 are illustrated outside of system 400, it is to be appreciated that in another example, one or more of these external entities may be internal to system 400. See, for example, system 500. In one example, retrieval logic 460 may retrieve items from their original location (e.g., location at which search logic 430 located item). In another example, retrieval logic 460 may retrieve items from a temporary location in which they were stored after being located by search logic 430.

Figure 5:
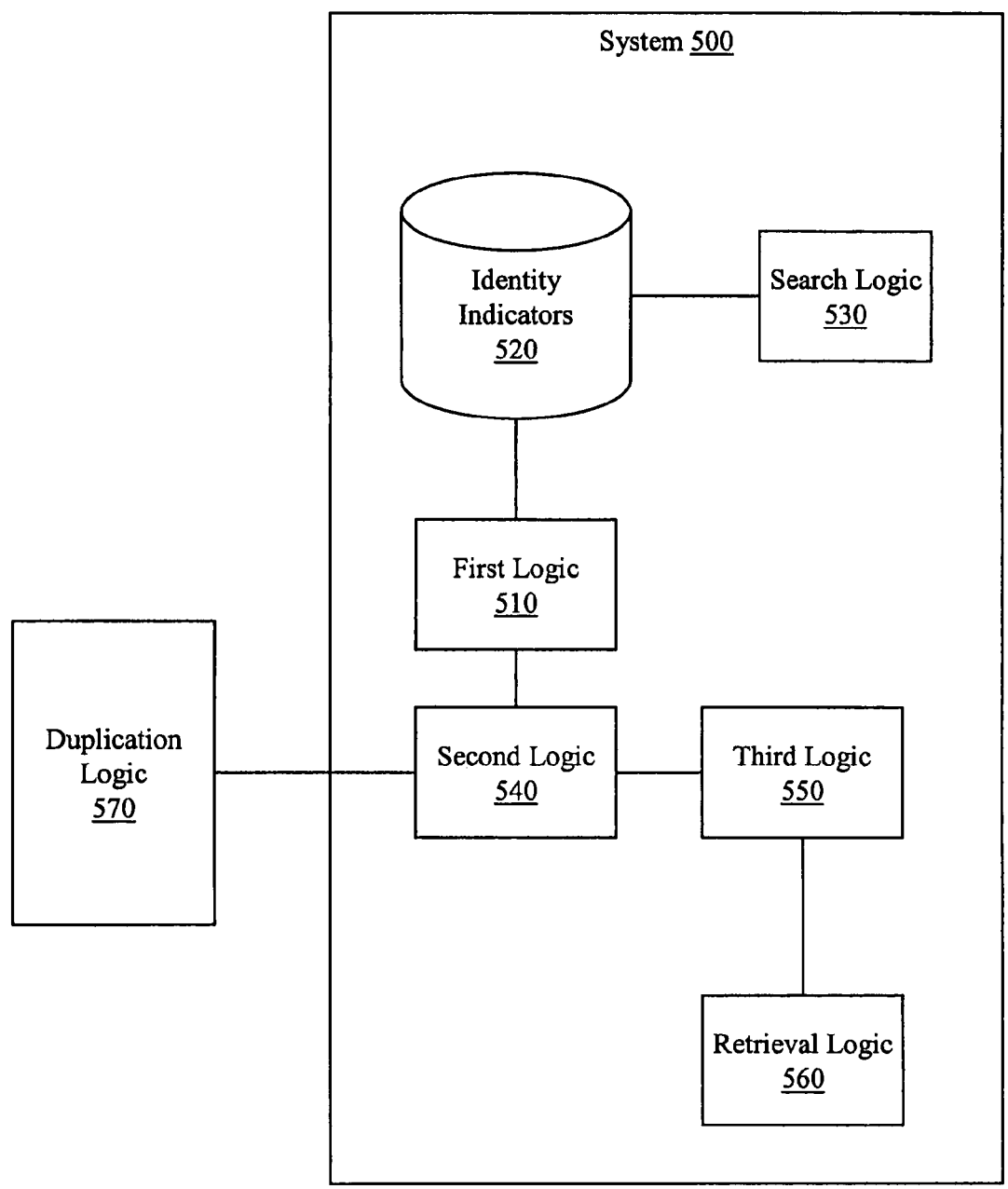
FIG. 5 illustrates another example system associated with detecting and handling duplicate search items.

FIG. 5 illustrates a system 500 that includes some elements similar to those described in connection with system 400 (FIG. 4). These elements include a first logic 510 to receive identity indicators 520, and a third logic 550 to control a retrieval logic 560 to retrieve selected items. System 500 may also include a search logic 530 and a retrieval logic 560.

Second logic 440 (system 400, FIG. 4) identifies unique identity indicators in set 420 and identifies subsets of duplicate identity indicators in set 420 by comparing the identity indicators itself. However, second logic 540 performs a different action. Rather than perform comparisons itself, second logic 540 may cause unique items and/or subsets of duplicate items to be identified by causing a duplication logic 570 identified by an identity indicator to compare other duplication indicia and/or items associated with identity indicators. In this case, an identity indicator may be a callback address that facilitates locating duplication logic 570 and invoking a process performed by duplication logic 570.

The duplication logic 570 may receive item identifiers and may provide a signal that indicates whether the items are unique, whether they are duplicates, which item amongst duplicates is superior (if any), and so on. Thus, third logic 550 may cause retrieval logic 560 to retrieve items based on the processing performed by duplication logic 570. This facilitates making duplicate identification extensible. Item providers (e.g., servers, applications, object managers, email systems, calendar systems, discussion forums) may provide their own duplication logics and may return the address of their duplication logic when they return items determined to be relevant to a search request. In this way, system 500 can deal with duplicates from any system that provides a duplication logic and a callback address that facilitates accessing that duplication logic. Additionally, as new sources become available, they may provide their own duplication logic and thus participate in duplicate identification removal.

Figure 6:
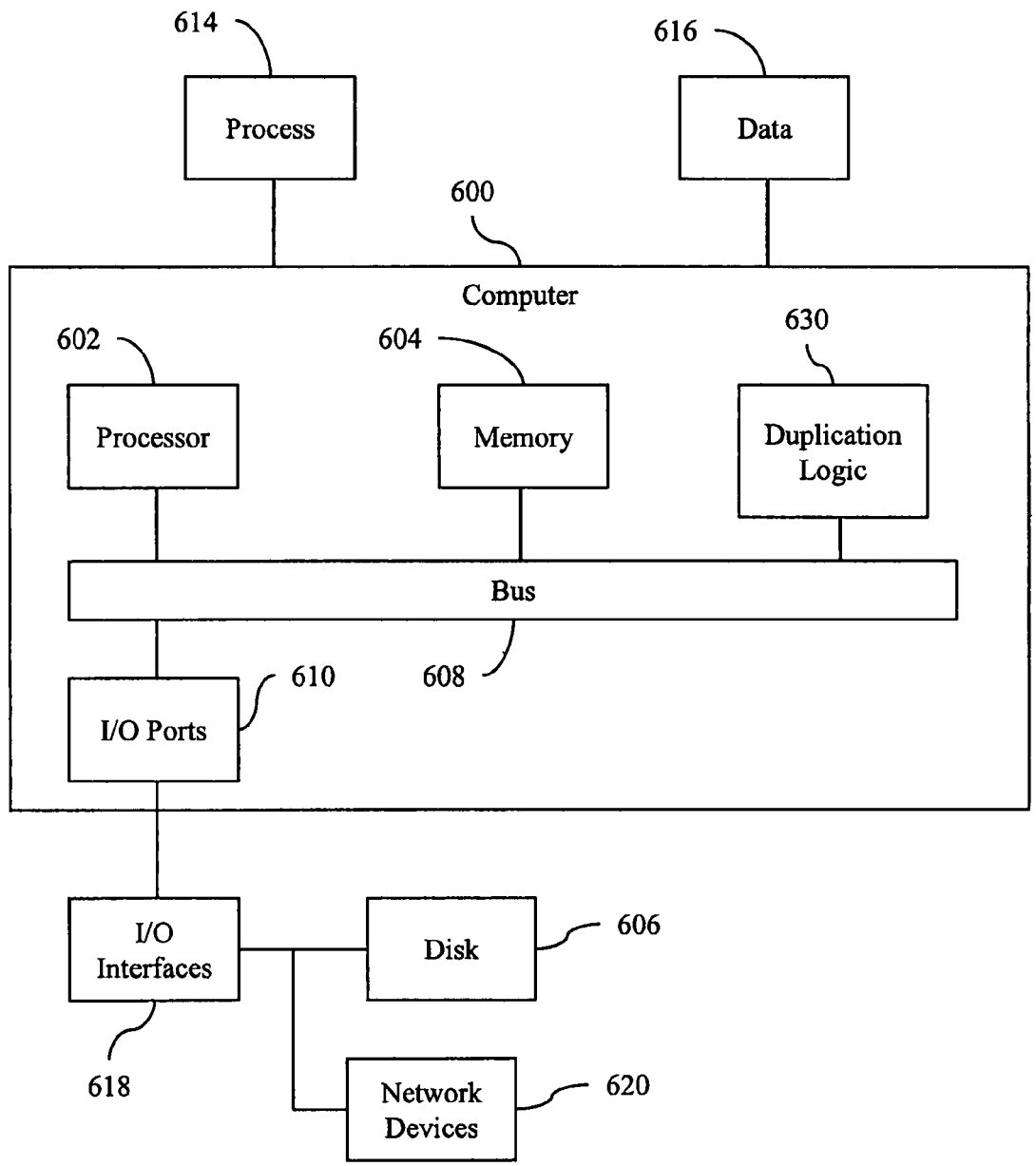
FIG. 6 illustrates an example computing environment in which example systems and methods illustrated herein can operate.

FIG. 6 illustrates an example computing device in which example systems and methods described herein, and equivalents, can operate. The example computing device may be a computer 600 that includes a processor 602, a memory 604, and input/output ports 610 operably connected by a bus 608. In one example, the computer 600 may include a duplication logic 630. Logic 630 may provide means (e.g., hardware, software, firmware) for storing a search result. The means may include a logic, a data store, and so on. The search result(s) may have been provided by a search engine, a crawler(s), and so on. Logic 630 may also provide means (e.g., hardware, software, firmware) for determining whether a source provided field associated with the search result indicates that the search result is a duplicate search result. The determination may be based on a comparison of the source provided field to other source provided fields associated with other search results. This is a direct comparison embodiment. Logic 630 may also provide means (e.g., hardware, software, firmware) for determining whether a process available through a source provided field associated with the search result indicates that the search result is a duplicate. This is an indirect comparison embodiment. Logic 630 may also provide means (e.g., hardware, software, firmware) for selectively deleting a search result that is determined to be a duplicate. In one example, the search result may be retained if it is a "superior" duplicate.

Generally describing an example configuration of the computer 600, the processor 602 can be a variety of various processors including dual microprocessor and other multiprocessor architectures. The memory 604 can include volatile memory and/or non-volatile memory. The non-volatile memory can include, but is not limited to, ROM, PROM, EPROM, EEPROM, and so on. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 can include, but is not limited to, devices including a magnetic disk drive, a solid state disk drive, a floppy disk drive, a tape drive, a Zip drive, a flash memory card, and/or a memory stick. Furthermore, the disk 606 can include optical drives including a CD-ROM, a CD recordable drive (CD-R drive), a CD rewriteable drive (CD-RW drive), and/or a digital video ROM drive (DVD ROM). The memory 604 can store processes 614 and/or data 616, for example. The disk 606 and/or memory 604 can store an operating system that controls and allocates resources of the computer 600.

The bus 608 can be a single internal bus interconnect architecture and/or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 600 may interact with input/output devices via i/o interfaces 618 and input/output ports 610. Input/output devices can include, but are not limited to, a keyboard, a microphone, a pointing and selection device, cameras, video cards, displays, disk 606, network devices 620, and so on. The input/output ports 610 can include but are not limited to, serial ports, parallel ports, and USB ports.

The computer 600 can operate in a network environment and thus may be connected to network devices 620 via the i/o devices 618, and/or the i/o ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 620 can connect to WAN technologies including, but not limited to, point to point links, circuit switching networks (e.g., integrated services digital networks (ISDN)), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-readable medium storing computer-executable instructions that when executed by a computer cause the computer to perform a method, the method comprising:
    identifying, in a set of items provided by a search process, a subset of items to compare, the set of items being identified by the search process as being relevant to a search request provided to the search process, where one or more items from the set of items includes an associated identity field;
    selectively removing from the set of items a first member of the subset of items upon determining that a comparison of the value of the identity field of the first member and the value of the identity field of a second member of the subset of items indicates that the first member and the second member are to be treated as duplicates; and
    where the identity field stores information upon which a duplicate determination can be made and stores priority information for an associated item, and
    where the selectively removing includes retaining the first member and the second member in a search result list when the first member and the second member are treated as duplicates and the associated priority information indicates that a duplicate member is to be retained.

2. The computer-readable medium of claim 1 the subset of items to compare including members that have related identity fields.

3. The computer-readable medium of claim 1, the method including:
    providing the search request to the search process, the search request being formatted to indicate that the search process is to provide identity fields associated with items; and
    receiving the set of items from the search process.

4. The computer-readable medium of claim 1, where the set of items includes one or more of, an email, a calendar entry, a document, a file, a record, and an object.

5. The computer-readable medium of claim 4, the record being one of, a purchase order, a client relationship management record, a sales receipt, and a message, and the object being one of, a productivity object, and a business object.

6. The computer-readable medium of claim 1, the search process being performed by an enterprise search engine.

7. The computer-readable medium of claim 6, where an item provided by the search process has two or more identity fields and where removing a member from the set of items depends on a comparison of two or more identity fields.

8. The computer-readable medium of claim 1, where an identity field may be populated by one or more of, a crawler, an object manager, and an application.

9. A method, comprising:
    receiving, by a processor of a computing device, a first item in response to a search, the first item including a duplication field;
    receiving, by the processor, a second item in response to the search, the second item also including a duplication field;
    selectively dismissing, by the processor, the first item or the second item upon determining that the value of the duplication field of the first item equals the value of the duplication field of the second item;
    where the duplication field stores information upon which a duplicate determination can be made and stores priority information for an associated item, and
    where the selectively dismissing includes retaining the first item and the second item in a search result list when the first item and the second item are treated as duplicates and the associated priority information indicates that a duplicate item is to be retained.

10. The method of claim 9, where the item to be dismissed is a lower priority duplicate.

11. The method of claim 9, the first item being one of, a document, a file, an object, an email, and a calendar entry, the second item being one of, a document, a file, an object, an email, and a calendar entry.

12. The method of claim 11, the search being performed by an enterprise search engine that selectively controls one or more crawlers to perform the search.

13. The method of claim 12, where a duplication field is populated by one or more of, a crawler, an item source, an application, and an object manager, and where the duplication field may be populated after an item has been indexed.

14. A method, comprising:
    storing, by at least a processor in a computing device, a first item received in response to a search, the first item including a duplication callback identifier, where the duplication callback identifier identifies a process to be executed to determine whether the first item is a duplicate item in the search;
    storing, by at least the processor, a second item received in response to the search, the second item also including a duplication callback identifier, where the duplication callback identifier identifies a process to be executed to determine whether the second item is a duplicate item in the search;
    initiating execution of the process identified by the duplication callback identifier read from the first item or the second item; and
    selectively deleting, by at least the processor, the second item upon determining that the process available through the duplication callback identifier determines that the first item and the second item are to be treated as duplicates.

15. The method of claim 14, the first item being one of, a document, a file, an object, an email, and a calendar entry, the second item being one of, a document, a file, an object, an email, and a calendar entry.

16. The method of claim 15, the process available through the duplication callback identifier being a user-definable process.

17. The method of claim 16, the process available through the duplication callback identifier being a remote process.

18. A system, comprising:
- a first logic, embodied in a computer-readable medium, to receive a set of identity indicators returned by a search logic in response to a search of an enterprise for items relevant to a search request, where the first logic reads a duplication callback identifier from the set of identity indicators, where the duplication callback identifier identifies a process to be executed to determine whether an item is a duplicate item in the search;
- a second logic, embodied on a computer-readable medium, to initiate execution of a process identified by the duplication callback identifier, where after initiation the second logic receives a duplication determination from the executed process to identify unique members of the set of identity indicators; and
- a third logic to cause a retrieval logic to retrieve, from the enterprise, items associated with unique members of the set of identity indicators.

19. The system of claim 18, where the second logic is to identify the unique members of the set of identity indicators by comparing identity indicators.

20. The system of claim 18, where the second logic is to identify unique members of the set of identity indicators by causing a duplication logic associated with the process identified by the duplication callback identifier to compare items associated with the identity indicator.

21. The system of claim 18, where:
- the second logic is to identify subsets of duplicate identity indicators in the set of identity indicators; and
- the third logic is to cause the retrieval logic to retrieve, from the enterprise, one item associated with each subset of duplicate identity indicators.

22. The system of claim 18, the search logic comprising an enterprise search engine that selectively controls one or more crawler logics to acquire the set of identity indicators.

23. The system of claim 22, including the search logic.

24. A system, comprising:
- means for storing a search result;
- means for determining whether a source provided field associated with the search result indicates that the search result is a duplicate search result when compared to a source provided field associated with a second search result, and initiating execution of a process identified by a callback identifier associated with a retrieved item with the search result, where the process indicates that the search result is a duplicate; and
- means for selectively deleting the search result.

25. A computer-readable medium storing computer-executable instructions that when executed by a computer cause the computer to perform a method, the method comprising:
- storing, by at least a processor in a computing device, a first item received in response to a search, the first item including a duplication callback identifier, where the duplication callback identifier identifies a process to be executed to determine whether the first item is a duplicate item in the search;
- storing, by at least the processor, a second item received in response to the search, the second item also including a duplication callback identifier, where the duplication callback identifier identifies a process to be executed to determine whether the second item is a duplicate item in the search;
- initiating execution of the process identified by the duplication callback identifier read from the first item or the second item; and
- selectively deleting, by at least the processor, the second item upon determining that the process available through the duplication callback identifier determines that the first item and the second item are to be treated as duplicates.

26. The computer-readable medium of claim 25, the first item being one of, a document, a file, an object, an email, and a calendar entry, the second item being one of, a document, a file, an object, an email, and a calendar entry.

27. The computer-readable medium of claim 26, the process available through the duplication callback identifier being a user-definable process.

28. The computer-readable medium of claim 27, the process available through the duplication callback identifier being a remote process.

* * * * *

UNITED STATES PATENT AND TRADEMARK OFFICE
CERTIFICATE OF CORRECTION

PATENT NO.         : 7,756,798 B2
APPLICATION NO.    : 11/714418
DATED              : July 13, 2010
INVENTOR(S)        : Muralidhar Krishnaprasad et al.

It is certified that error appears in the above-identified patent and that said Letters Patent is hereby corrected as shown below:

In column 2, line 37, delete "firmware" and insert -- firmware, --, therefor.

In column 11, line 44, in claim 2, delete "claim 1" and insert -- claim 1, --, therefor.

Signed and Sealed this
Twenty-sixth Day of April, 2011

David J. Kappos
*Director of the United States Patent and Trademark Office*